(12) United States Patent
Warner et al.

(10) Patent No.: US 12,405,668 B2
(45) Date of Patent: Sep. 2, 2025

(54) FORCE FEEDBACK TRIGGER FOR HANDHELD DEVICE

(71) Applicant: Meta Platforms Technologies, LLC, Menlo Park, CA (US)

(72) Inventors: Michelle Warner, Seattle, WA (US); Madeline Blair Aby, Seattle, WA (US); Rémy O'Leary Pieron, North Bend, WA (US); Tzu-Yuan Wang, Campbell, CA (US); Lorenz Henric Jentz, Seattle, WA (US); Jason Andrew Higgins, Seattle, WA (US); Walker Robb, Seattle, WA (US); Michael Allison, Ridgefield, WA (US); Joshua Yasbek, Portland, OR (US); Douglas Harriman, Portland, OR (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 17 days.

(21) Appl. No.: 18/334,247

(22) Filed: Jun. 13, 2023

(65) Prior Publication Data

US 2023/0400926 A1    Dec. 14, 2023

Related U.S. Application Data

(60) Provisional application No. 63/351,780, filed on Jun. 13, 2022.

(51) Int. Cl.
*G06F 3/01* (2006.01)
*A63F 13/285* (2014.01)

(52) U.S. Cl.
CPC ............ *G06F 3/016* (2013.01); *A63F 13/285* (2014.09)

(58) Field of Classification Search
CPC ............................... G06F 3/016; A63F 13/285
See application file for complete search history.

(56) References Cited

U.S. PATENT DOCUMENTS

2010/0283731 A1* 11/2010 Grant ...................... G06F 3/016
                                                            345/158
2016/0361637 A1* 12/2016 Higgins ................. A63F 13/213
(Continued)

FOREIGN PATENT DOCUMENTS

EP          3270265 A2      1/2018

OTHER PUBLICATIONS

International Search Report and Written Opinion for International Application No. PCT/US2023/025227, mailed Sep. 22, 2023, 11 pages.

*Primary Examiner* — Kwang-Su Yang
(74) *Attorney, Agent, or Firm* — McDermott Will & Emery LLP

(57) ABSTRACT

As disclosed herein, a system may comprise a handheld device in electronic communication with a controller. The handheld device may comprise a housing defining an internal cavity and an orifice providing access to the internal cavity. A trigger may comprise an external and an internal surface. The trigger may be oriented to cover the orifice. A transfer member may be oriented in the internal cavity and coupled to the internal surface of the trigger. A force sensor may be oriented in the internal cavity and may engage a distal end of the transfer member and the internal surface of the trigger. A transfer roller may be oriented in the internal cavity and coupled to the distal end of the transfer member. A cam may be oriented in the internal cavity and may engage the transfer member. A motor may be oriented in the internal cavity and coupled to the cam.

20 Claims, 9 Drawing Sheets

(56) References Cited

U.S. PATENT DOCUMENTS

2017/0351332 A1  12/2017 Grant et al.
2018/0021082 A1* 1/2018 Trees ................ A61B 18/1445
                                                        606/205
2019/0278370 A1  9/2019 Rihn et al.

* cited by examiner

FORCE FEEDBACK TRIGGER FOR HANDHELD DEVICE

CROSS-REFERENCE TO RELATED APPLICATIONS

The present application claims the benefit of priority under 35 U.S.C. § 119(e) to U.S. Provisional Patent Application No. 63/351,780, filed Jun. 13, 2022, the disclosure of which is hereby incorporated by reference in its entirety for all purposes.

TECHNICAL FIELD

The present disclosure is directed toward augmented reality/virtual reality (AR/VR) handheld hardware. More particularly, the present disclosure relates to augmenting haptic feedback for a trigger in a handheld device.

BACKGROUND

In an augmented reality/virtual reality (AR/VR) environment, the tactile feel and manipulation of an object can be difficult to simulate. These tangible characteristics of an object can include the object's weight, rigidity, or texture. Simulating these characteristics can become increasingly difficult when simulating an action on the object in the AR/VR environment. For example, if a user is squeezing a tennis ball in the environment, a more realistic simulation would be able to capture the user's natural perception of squeezing a tennis ball when manipulating their handheld device.

SUMMARY

The subject disclosure provides for an augmented reality/virtual reality (AR/VR) system that may provide haptic feedback to a user of a handheld device of the system. The disclosure concerns the problem of effectively simulating actions performed on objects in an AR/VR environment. The disclosure addresses the problem by configuring a system capable of receiving an input force from a trigger of the handheld device, determining an output force to be delivered to the user, and delivering the output force to the user.

According to certain aspects of the present disclosure, a system may include a handheld device and a controller. The handheld device may be in electronic communication with the controller. The handheld device may include a housing that defines an internal cavity and that defines an orifice providing access to the internal cavity. A trigger may include an external surface and an internal surface, and the trigger may be oriented to cover the orifice. A transfer member may be oriented in the internal cavity and coupled to the internal surface of the trigger. A force sensor may be oriented in the internal cavity and engaged to a distal end of the transfer member and the internal surface of the trigger. A transfer roller may be oriented in the internal cavity and coupled to the distal end of the transfer member. A cam may be oriented in the internal cavity and configured to engage the transfer member. A motor may be oriented in the internal cavity and coupled to the cam.

According to other aspects of the present disclosure, a system may include a handheld device. The handheld device may include a housing that defines an internal cavity and that defines an orifice providing access to the internal cavity. A trigger may include an external surface and an internal surface, and the trigger may be oriented to cover the orifice. A transfer member may be oriented in the internal cavity and coupled to the internal surface of the trigger. A force sensor may be oriented in the internal cavity and engaged to a distal end of the transfer member and the internal surface of the trigger. A transfer roller may be oriented in the internal cavity and coupled to the distal end of the transfer member. A cam may be oriented in the internal cavity and configured to engage the transfer member. A motor may be oriented in the internal cavity and coupled to the cam. A controller may be in electronic communication with the handheld device. The controller may receive, from the force sensor, a force input from the trigger. Based on the force input, the controller may determine a response force to be applied to the transfer member. The controller may cause the motor to initiate a rotation, transferring a rotational force through the cam and applying the response force to the transfer member.

According to yet other aspects of the present disclosure, a system may include a handheld device. The handheld device may include a housing that defines an internal cavity and that defines an orifice providing access to the internal cavity. A trigger may include an external surface and an internal surface, and the trigger may be oriented to cover the orifice. A transfer member may be oriented in the internal cavity and coupled to the internal surface of the trigger. A force sensor may be oriented in the internal cavity and engaged to a distal end of the transfer member and the internal surface of the trigger. A transfer roller may be oriented in the internal cavity and coupled to the distal end of the transfer member. A cam may be oriented in the internal cavity and configured to engage the transfer member. A motor may be oriented in the internal cavity and coupled to the cam. A gear train may be coupled to the motor and the cam. The gear train may adjust a rotational speed or a torque applied to the cam by the motor. A controller may be in electronic communication with the handheld device. The controller may receive, from the force sensor, a force input from the trigger. Based on the force input, the controller may determine a response force to be applied to the transfer member. The controller may cause the motor to initiate a rotation, transferring a rotational force through the cam and applying the response force to the transfer member.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Without engaging a person's sense of touch, augmented reality/virtual reality (AR/VR) systems are limited in the immersive experience they can provide that person. Haptic feedback technology has the potential to improve user satisfaction with AR/VR systems by bridging the divide between the real world and the digital world. However, it is difficult to faithfully simulate an object's tangible characteristics (e.g., weight, rigidity, texture) when the object is acted on in an AR/VR environment. The technology disclosed herein provides for augmenting a handheld AR/VR controller trigger with force feedback haptic technology.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regards to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the included clauses. Various aspects of the subject technology will now be disclosed according to particular but non-limiting examples. Various embodiments described in the present disclosure may be carried out in different ways and variations, and in accordance with a desired application or implementation.

In the following detailed description, numerous specific details are set forth to provide a full understanding of the present disclosure. It will be apparent, however, to one ordinarily skilled in the art, that embodiments of the present disclosure may be practiced without some of the specific details. In other instances, well-known structures and techniques have not been shown in detail so as not to obscure the disclosure.

Figure 1:
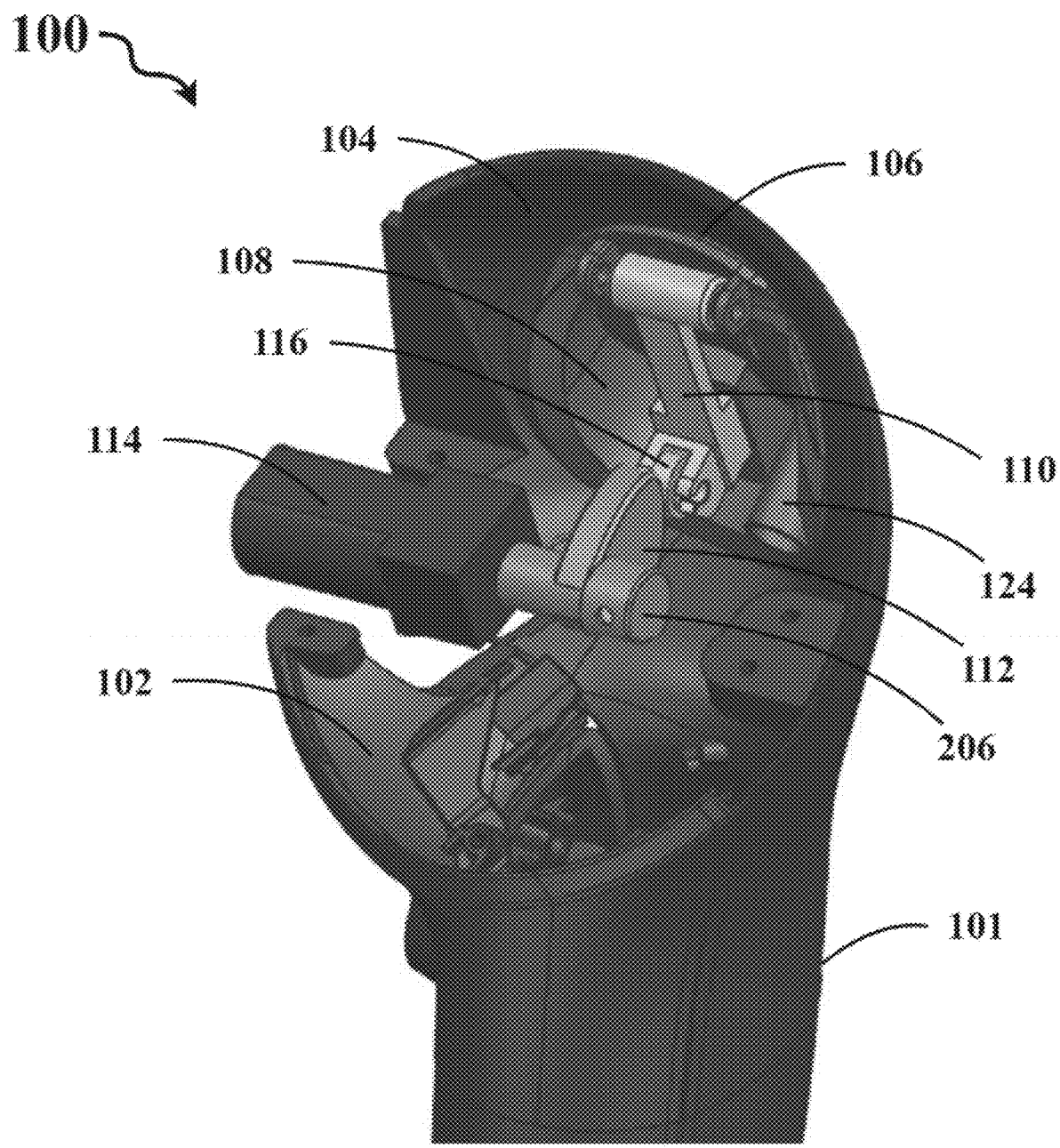
FIG. 1 illustrates an isometric cutaway of the internal components of a system comprising a handheld device, according to certain aspects of the disclosure.

Turning now to the figures, FIG. 1 illustrates an isometric cutaway of the internal components of a system 100 comprising a handheld device 101, according to certain aspects of the disclosure. The handheld device 101 includes a housing 102; an internal cavity 104; an orifice 106; a trigger 108; a transfer member 110; a cam 112; a motor 114, which may include a gear train 208 (depicted in FIG. 3); a transfer roller 116; a trigger position sensor 124; and a cam position sensor 206. The housing 102 may define the internal cavity 104, where the internal components of the handheld device 101 may be seated. The housing 102 may define the orifice 106, which may provide access to the internal cavity 104. The trigger 108 may include an external surface and an internal surface, and the trigger 108 may be oriented to cover the orifice 106. The trigger 108 may be the component of the handheld device 101 where a user applies a force, causing a portion of the trigger to recede into the internal cavity 104. The transfer member 110 may be oriented in the internal cavity 104 and coupled to the internal surface of the trigger 108. The receding trigger 108 may initiate motion in the transfer member 110.

The cam 112 may convert at least rotational or oscillatory motion to at least linear or translational motion. The transfer member 110 (also known as a follower, a cam follower, or a track follower) may include a translating or oscillating lever that may engage the cam 112 directly, indirectly, or a combination thereof, and may follow the profile of the cam 112 as the cam 112 rotates or translates. The motion of the transfer member 110 may be based on the profile of the cam 112. The cam 112 may include a disk cam (also known as a plate cam or a radial cam), wherein the transfer member 110 may move radially from the center of rotation of the cam 112; a linear or translational cam, wherein the cam 112 translates rather than rotates; a pear-shaped cam, wherein the transfer member 110 may remain stationary for approximately half the rotation of the cam 112 and then rise and fall for approximately the other half of the rotation; a circular cam (also known as an eccentric cam), wherein the transfer member 110 smoothly reciprocates; a heart-shaped cam, wherein the transfer member 110 may move back and forth with uniform velocity; or any standard shape (e.g., star, snail) or nonstandard shape appropriate to affect the proper motion of the transfer member 112. The transfer member 112 may include an oscillating (or rotating) follower; a translating (or reciprocating) follower; a roller follower; a spherical-faced follower; a knife-edge follower; a flat-faced (or mushroom) follower; or any standard or nonstandard shape or configuration appropriate to affect proper engagement with the cam 112 and proper motion of the transfer member 110.

In further aspects, the motor 114 may include a rotational motor configured to cause the cam 112 to rotate about an axis. In further aspects, the trigger position sensor 124 may be a Hall effect sensor. In further aspects, the Hall effect sensor may provide data regarding a simulated action in an augmented reality/virtual reality (AR/VR) environment.

Figure 2:
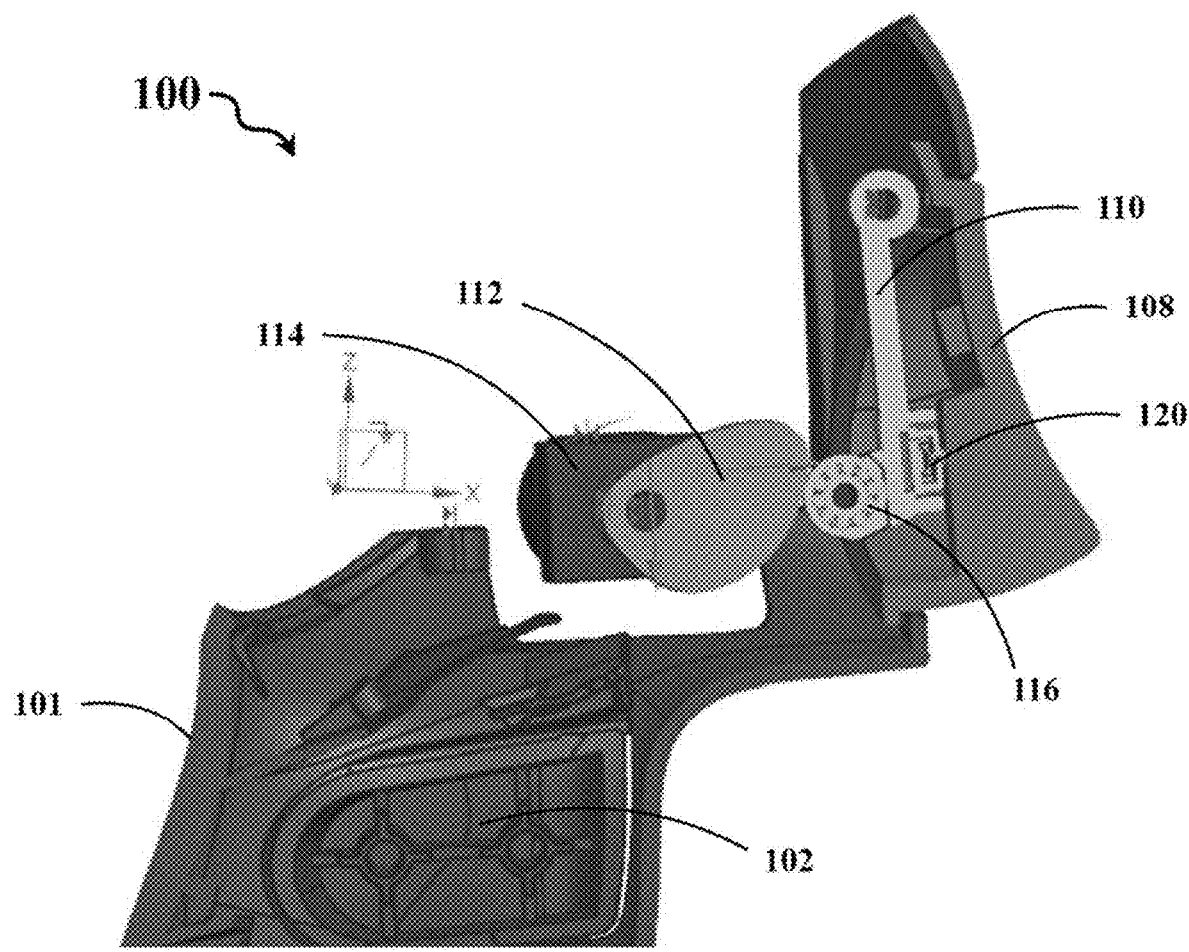
FIG. 2 illustrates a side cutaway view of the internal components of the system comprising the handheld device shown in FIG. 1.

FIG. 2 illustrates a side cutaway view of the internal components of the system 100 comprising the handheld device 101 shown in FIG. 1. The handheld device 101 includes the housing 102, the trigger 108, the transfer member 110, the cam 112, the motor 114, a transfer roller 116, and a force sensor 120. The force sensor 120 may include one or more load cells (e.g., capacitive load cells, inductive load cells, hydraulic load cells, magnetostrictive load cells, piezoelectric crystal load cells, pneumatic load cells, strain gage load cells), force sensing resistors (FSR's), optical force sensors, strain gauges, ultrasonic force sensors, or the like. The force sensor 120 may be oriented in the internal cavity and engaged to a distal end of the transfer member 110 and the internal surface of the trigger 108. The transfer roller 116 may be oriented in the internal cavity and coupled to the distal end of the transfer member 110. The cam 112 may be oriented in the internal cavity and configured to engage the transfer member 110. The motor 114 may be oriented in the internal cavity and coupled to the cam 112. The cam 112 may be coupled to the motor 114, wherein the motor 114 may cause the cam to rotate.

Figure 6:
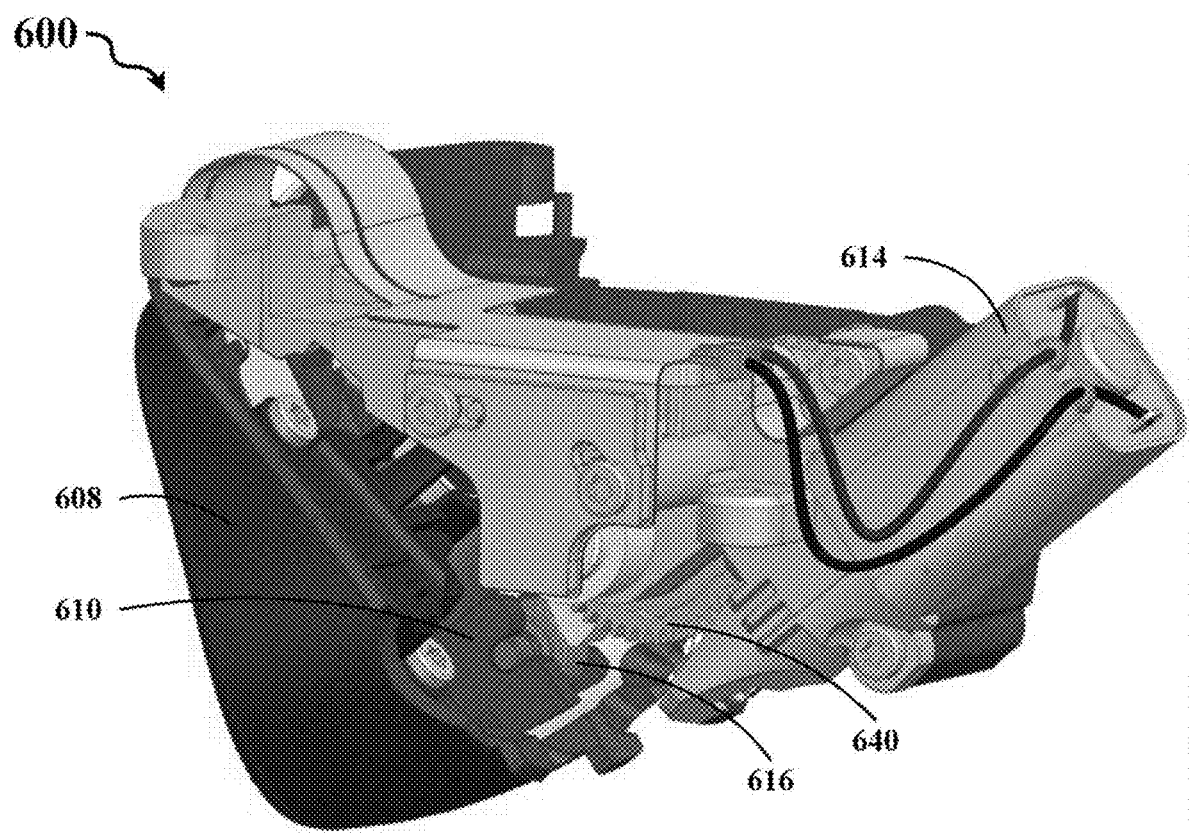
FIG. 6 illustrates an isometric view of a force feedback trigger mechanism of a system comprising a handheld device, according to other aspects of the disclosure.

FIG. 6 illustrates an isometric view of a force feedback trigger mechanism of a system 600 comprising a handheld device, according to other aspects of the disclosure. The force feedback trigger mechanism includes a trigger 608, wherein triggers 108 and 608 may be similar, the same, or different components; a transfer member 610, wherein transfer members 110 and 610 may be similar, the same, or different components; a transfer roller 616, wherein transfer rollers 116 and 616 may be similar, the same, or different components; and a motor 614, wherein motors 114 and 614 may be similar, the same, or different components. The system 600 also includes a worm wheel 640.

Figure 7:
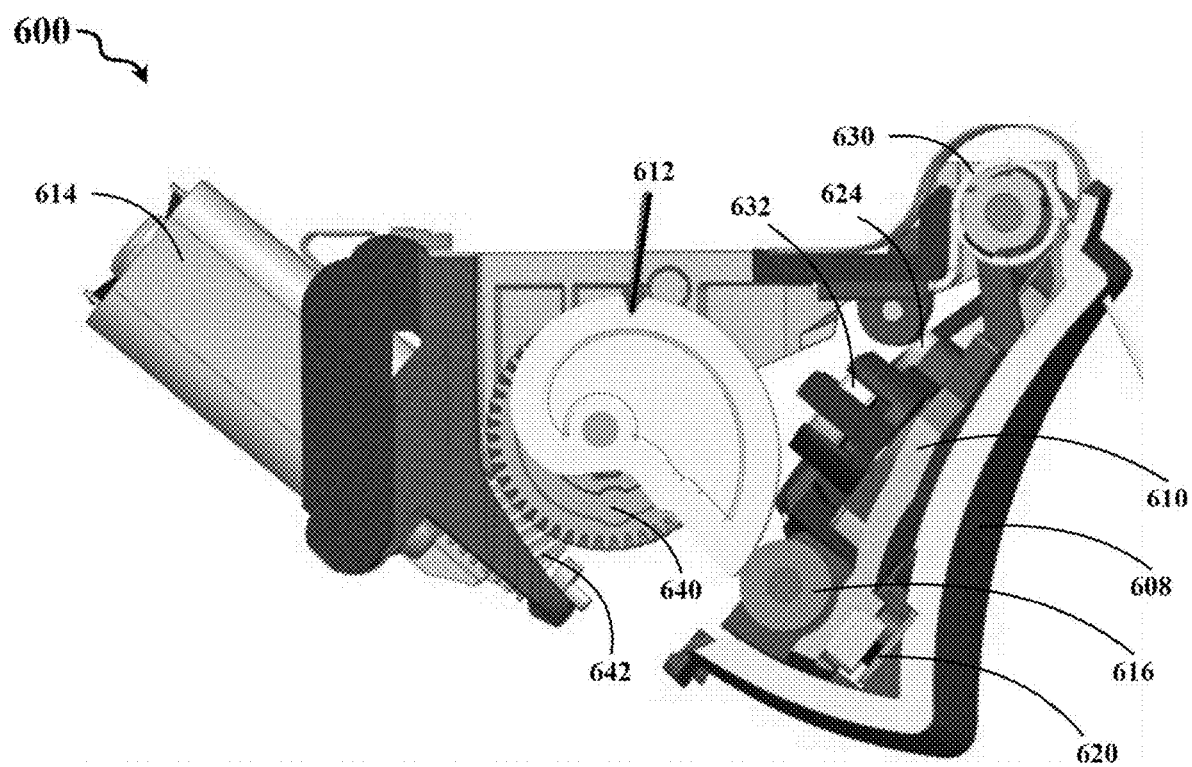
FIG. 7 illustrates a side cutaway view of the force feedback trigger mechanism of the system comprising a handheld device shown in FIG. 6.
Figure 8:
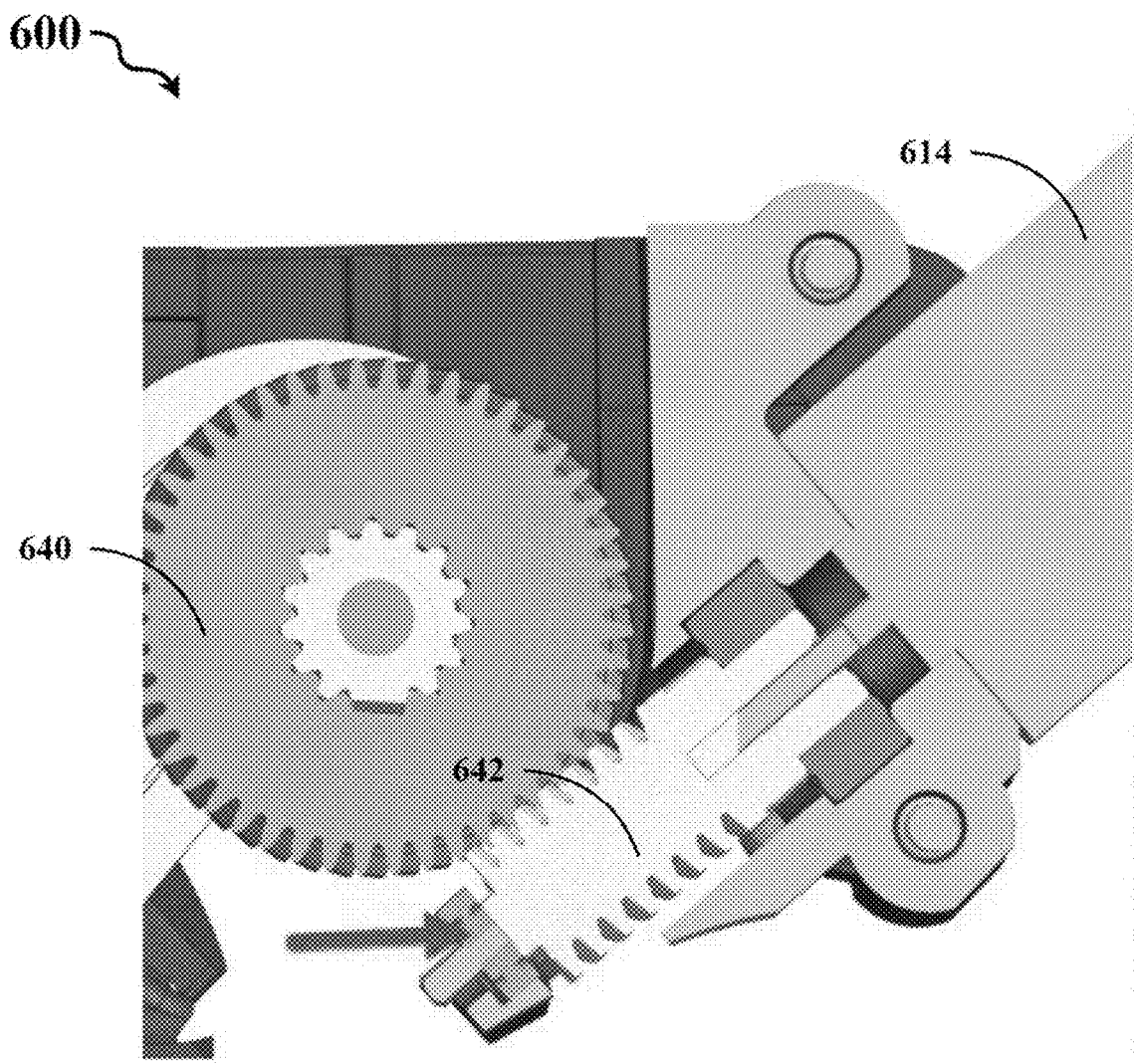
FIG. 8 illustrates a reverse side cutaway view of the worm gear and the motor of the force feedback trigger mechanism of the system comprising a handheld device shown in FIGS. 6 and 7.

FIG. 7 illustrates a side cutaway view of the force feedback trigger mechanism of the system 600 comprising a handheld device shown in FIG. 6. The force feedback trigger mechanism includes a cam 612, wherein cams 112 and 612 may be similar, the same, or different components; a force sensor 620, wherein force sensors 120 and 620 may be similar, the same, or different components; a trigger position sensor 624, wherein trigger position sensors 124 and 624 may be similar, the same, or different components; and a worm gear including a worm wheel 640 and a worm 642. The force sensor 620 may be engaged to a distal end of the transfer member 610 and the internal surface of the trigger 608. The transfer roller 616 may be coupled to the distal end of the transfer member 610. The cam 612 may be configured to engage the transfer member 610 and the worm gear. FIG. 8 illustrates a reverse side cutaway view of the worm gear and the motor of the force feedback trigger mechanism of the system comprising a handheld device shown in FIGS. 6 and 7. The worm wheel 640 may be coupled to the worm 642, which may be coupled to the motor 614 by a shaft of the motor 614. The motor 614, via the worm gear, may cause the cam 612 to rotate. In further aspects, a spring 630 may provide spring force to return the trigger 608 from a recessed position, which may be caused by a user applying force to the trigger 608. In further aspects, the trigger 608 may comprise a localized haptic motor 632.

According to certain aspects of the disclosure as illustrated in FIGS. 1 and 2, the linear force applied by a user to the trigger 108 may be converted to a rotational force via the transfer member 110. At a proximal end of the transfer member 110, the transfer member 110 may be coupled to an internal surface of the trigger 108. The coupling between the transfer member 110 and the trigger 108 may allow the transfer member 110 to rotate. In further aspects, a first section of the distal end of the transfer member 110 may engage the force sensor 120 and a second section of the distal end of the transfer member 110 may be coupled to the transfer roller 116. The rotational force transferred through the transfer member 110 may cause the transfer roller 116 coupled at the distal end of the transfer member 110 to engage the cam 112. In a further aspect, the transfer roller 116 may comprise a roller bearing configured to maintain contact and roll over a surface. As the transfer member 110 rotates, the transfer roller 116 at the distal end of the transfer member 110 may roll along the external surface of the cam 112. The motion of the cam 112 may also be controlled by the motor 114. The motor 114 may initiate a rotation of the cam 112. As the motor 114 initiates a rotation, the rotating cam 112 may produce a force that may be transferred back to the transfer member 110, resulting in haptic feedback to a user squeezing the trigger 108. According to the other aspects of the disclosure as illustrated in FIGS. 6-8, where the components are similar or the same, similar or the same configurations may be arranged or actions may be performed.

Figure 3:
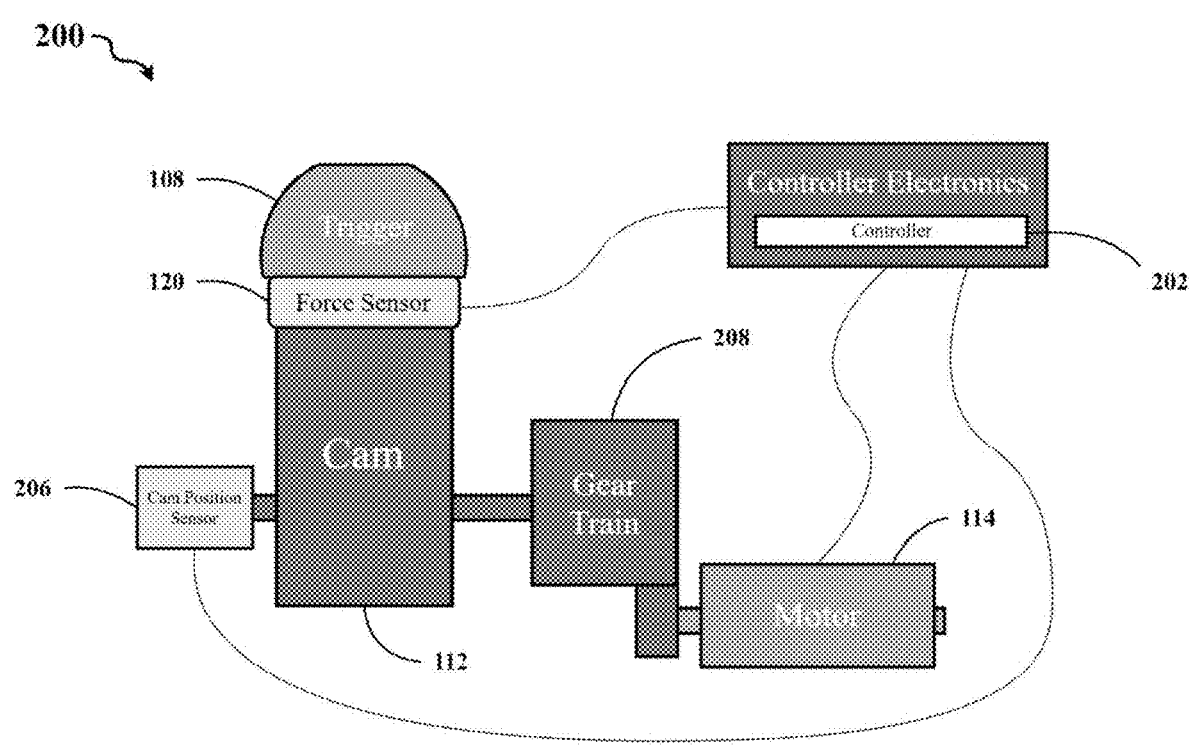
FIG. 3 illustrates a block diagram of the electronic components and connections of the system comprising the handheld device shown in FIGS. 1 and 2.

FIG. 3 illustrates a block diagram of an electrical communication system 200 comprising the handheld device 101, shown in FIGS. 1 and 2, and a controller 202. The controller 202 may be a computing device that is in electrical communication with the motor 114, the force sensor 120, and the cam position sensor 206. The cam position sensor 206 may include a contacting sensor (e.g., rotary potentiometer) or a non-contacting sensor. The cam position sensor 206 may include one or more of a variable reluctance sensor, a magneto-resistive element (MRE) sensor, a pass-through sensor, a Hall effect sensor, a magnetic-less Hall effect sensor, a rotary variable differential transformer (RVDT), or the like. In further aspects, the cam position sensor 206 may include an encoder, wherein the encoder is configured to detect the rotation of the cam and to convert at least rotary position to electronic signals. During operation of the handheld device 101, the controller 202 may first receive force inputs from the trigger 108 via the force sensor 120. In response, the controller 202 may cause the motor 114 to initiate a rotation, transferring a rotational force through the cam 112 and applying a response force to the transfer member 110. In a further aspect, the oblong shape of the cam 112 cross-section may facilitate a rate change in force transfer from the motor 114 while the transfer roller 116 rolls along the shape of the cam 112. In a further aspect, the rate of change for the cam 112 rotation may be adjusted by switching a driving gear (not shown) in the gear train 208. The gear train 208, which may be coupled to the motor 114 and the cam 112, may be a set of rotational gears that may be configured to adjust a rotational speed or a torque applied to the cam by the motor, or may allow a user to select a particular gear to vary the torque output and/or the rotational speed output. For example, when a user is in an AR/VR environment and is in a simulation of squeezing a tennis ball, the controller may cause the motor 114 and cam 112 to rotate, generating a response resistive force transferred to trigger 108 that is consistent with the responsive force a user would feel when trying to squeeze the tennis ball.

Figure 4:
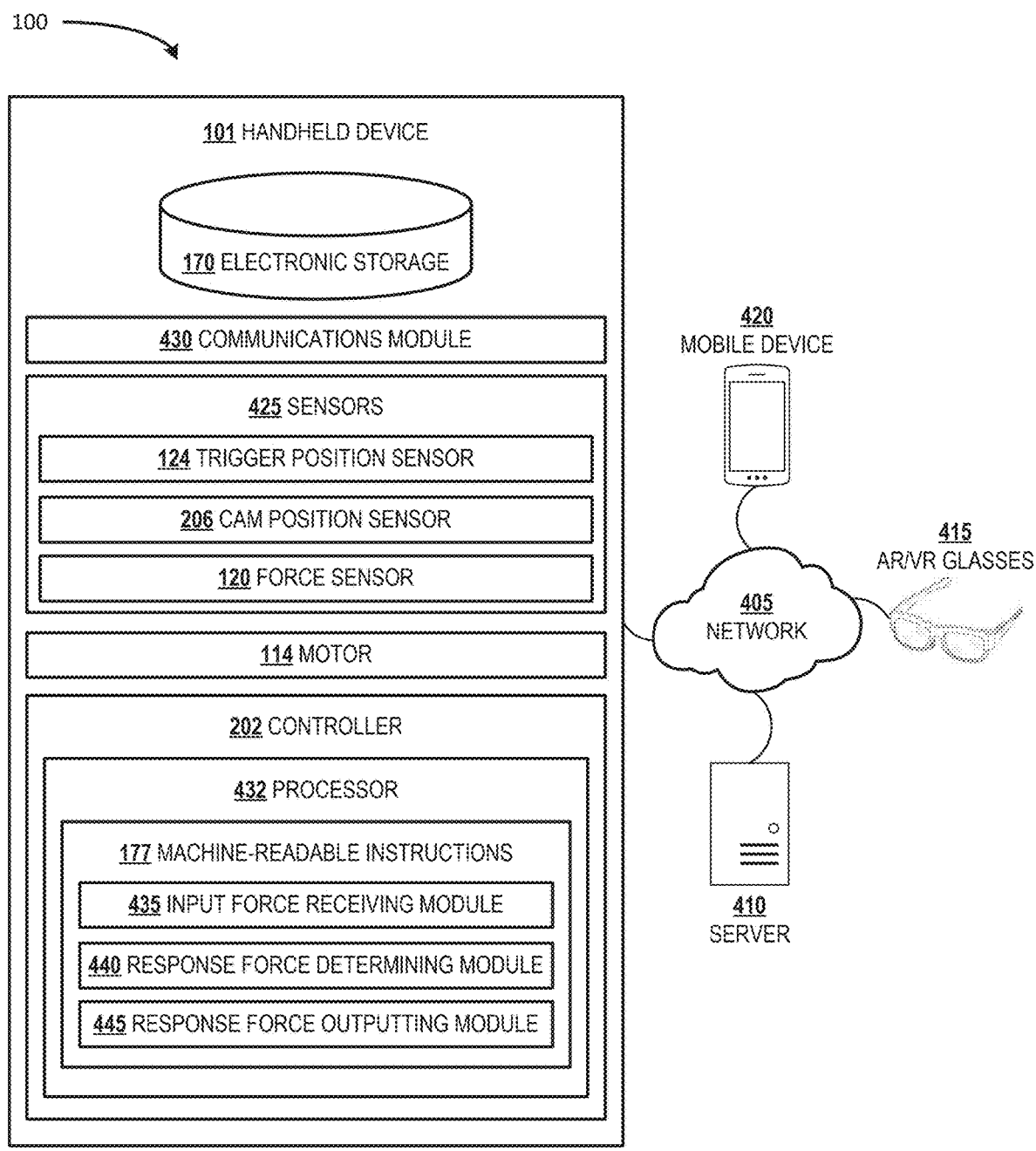
FIG. 4 illustrates a block diagram of a network architecture including the handheld device shown in FIGS. 1 and 2.

FIG. 4 illustrates a block diagram of the system 100 including the handheld device 101 shown in FIGS. 1 and 2. The system includes a network 405; a server 410; a set of AR/VR goggles 415; a mobile device 420; an electronic storage 170; sensors 425; which include the force sensor 120, the trigger position sensor 124, and the cam position sensor 206; motor 114; communications module 430; and the controller 202, which includes a processor 432. The processor 432 includes machine-readable instructions 177 that include an input force receiving module 435, a response force determining module 440, and a response force outputting module 445.

The network 405 interconnecting the elements of the system 100 may correspond to a communication network. The communication network may be any one of a local area network (LAN), wide area network (WAN), the Internet, a direct peer-to-peer (P2P) network (e.g., Bluetooth®), indirect P2P network, and the like. The server 410 may correspond to one or more server computers. The server 410 may be located locally or remotely. The server 410 may host one or more applications installed on the handheld device 101, the AR/VR glasses 150, or the mobile device 420. The one or more applications may allow the user to control settings or to provide, collect, or process data gathered by the handheld device 101, the AR/VR glasses 150, or the mobile device 420.

The mobile device 420 may include one or more mobile devices, which may include laptop computers, E-readers, tablets, handheld video gaming consoles, smart watches, smart speakers, and smartphones. The mobile device 420 may host one or more applications that allow the mobile device 420 to operate the handheld device 101 or the AR/VR glasses 415, or to be operated by the handheld device 101 or the AR/VR glasses 415.

The AR/VR glasses 415 may include head-worn, tethered, or standalone devices that allow for augmented reality (AR), virtual reality (VR), or mixed reality (MR) experiences. In further aspects, the AR/VR glasses 415 may include a set of augmented reality (AR) glasses. The AR glasses may be transmissive or non-transmissive. The transmissive AR glasses may overlay interactable digital objects onto a real-world environment. In further aspects, the AR/VR glasses 415 may include a virtual reality (VR) headset. The VR headset may include a head-mounted display that affords a fully immersive visual and audio experience. The VR headset may include cameras that allow a user to perceive the real world on the VR screen as if the user were looking directly at the real world. In further aspects, the AR/VR glasses 415 may include mobile AR devices (e.g., a smartphone). The mobile AR device may host an application that uses one or more of the cameras, sensors, and processing power of the mobile AR device to overlay digital objects and information onto a real-world environment.

The one or more sensors 425 may include at least one of cameras, motion sensors, light sensors, proximity sensors, temperature sensors, biometric sensors, magnetometers, and Global Positioning System (GPS) receivers. The sensors 425 may be physical or virtual, and they may capture real-world elements, virtual world elements, or a combination thereof. The communications module 430 may include radio and antenna hardware or software to send and receive wireless signals via the network 405, to and from at least one of the server 410, the AR/VR glasses 415, and the mobile device 420.

Processor 432 may be configured to provide information processing capabilities in handheld device 101. Processor 432 may include one or more processors, which may include one or more control units, arithmetic-logic units (ALU's), and processor registers for the operations of modules 435, 440, and/or 445, and/or other modules. Processor 432 may include one or more of a digital processor, an analog processor, a digital circuit designed to process information, an analog circuit designed to process information, a state machine, and/or other mechanisms for electronically processing information. Although processor 432 is shown in FIG. 4 as a single entity, this is for illustrative purposes only. In some implementations, processor 432 may include a plurality of processing units. These processing units may be physically located within the same device, or processor 432 may represent processing functionality of a plurality of devices operating in coordination. Processor 432 may be configured to execute modules 435, 440, and/or 445, and/or other modules. Processor 432 may be configured to execute modules 435, 440, and/or 445, and/or other modules by software; hardware; firmware; some combination of software, hardware, and/or firmware; and/or other mechanisms for configuring processing capabilities on processor 432.

As used herein, the term "module" may refer to any component or set of components that perform the functionality attributed to the module. This may include one or more physical processors during execution of processor-readable instructions, the processor-readable instructions, circuitry, hardware, storage media, or any other components. It should be appreciated that although modules 435, 440, and/or 445, and/or other modules are illustrated in FIG. 4 as being implemented within a single processing unit, in implementations in which processor 432 includes multiple processing units, one or more of modules 435, 440, and/or 445, and/or other modules may be implemented remotely from the other modules. The description of the functionality provided by the different modules 435, 440, and/or 445, and/or other modules described below is for illustrative purposes, and is not intended to be limiting, as any of modules 435, 440, and/or 445, and/or other modules may provide more or less functionality than is described. For example, one or more of modules 435, 440, and/or 445, and/or other modules may be eliminated, and some or all of its functionality may be provided by other ones of modules 435, 440, and/or 445, and/or other modules. As another example, processor 432 may be configured to execute one or more additional modules that may perform some or all of the functionality attributed below to one of 435, 440, and/or 445, and/or other modules.

The input force receiving module 435 may receive, via the force sensor 120, a force input from the trigger 108. The response force determining module 440 may determine, based on the force input, a response force to be applied to the transfer member. The response force outputting module 445 may cause the motor 114 to initiate a rotation, transferring a rotational force through the cam 112 and applying the response force to the transfer member 110.

Figure 5:
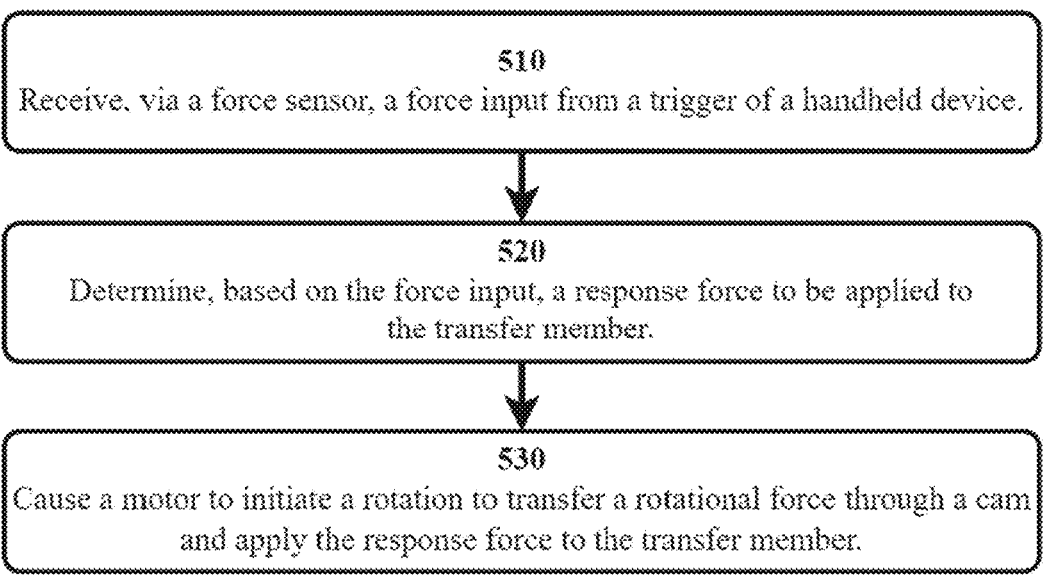
FIG. 5 illustrates a process flow diagram of a method that may be performed by the system comprising a handheld device and a controller shown in FIGS. 1 to 4.

FIG. 5 illustrates a process flow diagram of a method 500 that may be performed by the system 100 comprising the handheld device 101 and the controller 202, shown in FIGS. 1 to 4. Block 510 describes receiving, via a force sensor (e.g., 120), a force input from a trigger (e.g., 108). Block 520 describes determining, based on the force input, a response force to be applied to a transfer member (e.g., 110). Block 530 describes causing a motor (e.g., 114) to initiate a rotation, transferring a rotational force through a cam (e.g., 112) and applying the response force to a transfer member (e.g., 110).

Figure 9:
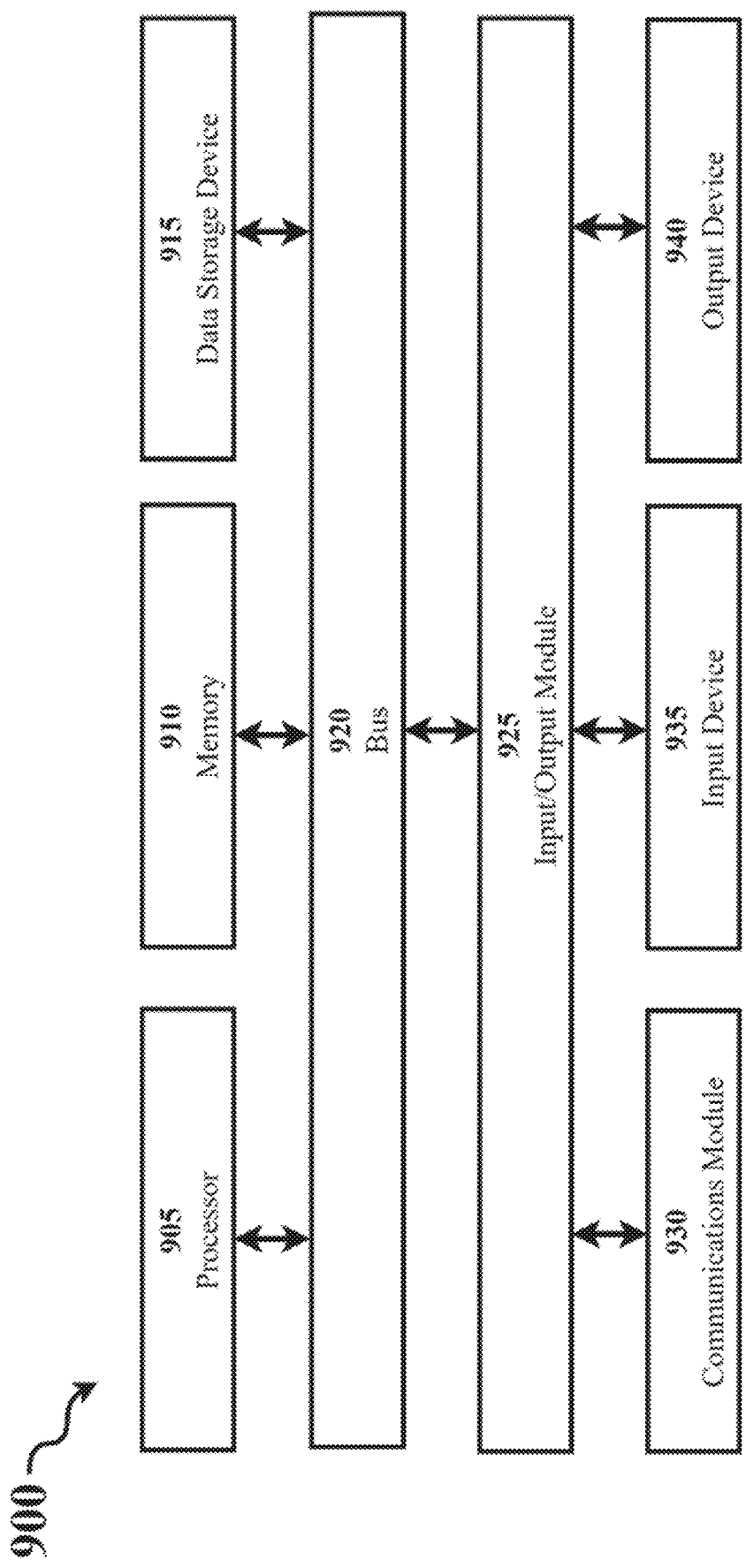
FIG. 9 illustrates a block diagram of an exemplary computer system with which aspects of the subject technology may be implemented.

FIG. 9 illustrates a block diagram of an exemplary computer system 900 with which aspects of the subject technology may be implemented. The computer system 900 includes a processor 905, wherein processors 432 and 905 may be similar, the same, or different components; a memory 910; a data storage device 915, wherein electronic storage 170 and data storage device 915 may be similar, the same, or different components; a bus 920; an input/output module 925; a communications module 930, wherein communications modules 430 and 930 may be similar, the same, or different components; an input device 935; and an output device 940. In certain aspects, the computer system 900 may be implemented using hardware or a combination of software and hardware, either in a dedicated server, integrated into another entity, or distributed across multiple entities.

Computer system 900 (e.g., server and/or client) includes a bus 920 or other communication mechanism for communicating information, and a processor 905 coupled with bus 920 for processing information. By way of example, the computer system 900 may be implemented with one or more processors 905. Processor 905 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 may include, in addition to hardware, code that creates an execution environment for the computer program in question, e.g., code that constitutes processor firmware, a protocol stack, a database management system, an operating system, or a combination of one or more of them stored in an included memory 910, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 920 for storing information and instructions to be executed by processor 905. The processor 905 and the memory 910 may be supplemented by, or incorporated in, special purpose logic circuitry.

The instructions may be stored in the memory 910 and implemented in one or more computer program products, i.e., one or more modules of computer program instructions encoded on a computer readable medium for execution by, or to control the operation of, the computer system 900, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, and XML-based languages. Memory 910 may also be used for storing temporary variable or other intermediate information during execution of instructions to be executed by processor 905.

A computer program as discussed herein does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 915, such as a magnetic disk or optical disk, coupled to bus 920 for storing information and instructions. Computer system 900 may be coupled via input/output module 925 to various devices. The input/output module 925 may be any input/output module. Exemplary input/output modules 925 include data ports such as USB ports. The input/output module 925 may be configured to connect to a communications module 930. Exemplary communications modules 930 include networking interface cards, such as Ethernet cards and modems. In certain aspects, the input/output module 925 is configured to connect to a plurality of devices, such as an input device 935 and/or an output device 940. Exemplary input devices 935 include a keyboard and a pointing device, e.g., a mouse or a trackball, by which a user may provide input to the computer system 900. Other kinds of input devices 935 may be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 940 include display devices such as an LCD (liquid crystal display) monitor, for displaying information to the user.

According to one aspect of the present disclosure, the above-described systems may be implemented using a computer system 900 in response to processor 905 executing one or more sequences of one or more instructions contained in memory 910. Such instructions may be read into memory 910 from another machine-readable medium, such as data storage device 915. Execution of the sequences of instructions contained in the memory 910 causes processor 905 to perform the process steps described herein. One or more processors in a multi-processing arrangement may also be employed to execute the sequences of instructions contained in memory 910. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification may be implemented in a computing system that includes a back-end component, e.g., such as a data server, or that includes a middleware component, e.g., an application server, or that includes a front-end component, e.g., a client computer having a graphical user interface or a Web browser through which a user may interact with an implementation of the subject matter described in this specification, or any combination of one or more such back-end, middleware, or front-end components. The components of the system may be interconnected by any form or medium of digital data communication, e.g., a communication network. The communication network may include, for example, any one or more of a LAN, a WAN, the Internet, and the like. Further, the communication network may include, but is not limited to, for example, any one or more of the following network topologies, including a bus network, a star network, a ring network, a mesh network, a star-bus network, tree or hierarchical network, or the like. The communications modules may be, for example, modems or Ethernet cards.

Computer system 900 may include clients and servers. A client and server are generally remote from each other and typically interact through a communication network. The relationship of client and server arises by virtue of computer programs running on the respective computers and having a client-server relationship to each other. Computer system 900 may be, for example, and without limitation, a desktop computer, laptop computer, or tablet computer. Computer system 900 may also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 905 for execution. Such a medium may take many forms, including, but not limited to, non-volatile media, volatile media, and transmission media. Non-volatile media include, for example, optical or magnetic disks, such as data storage device 915. Volatile media include dynamic memory, such as memory 910. Transmission media include coaxial cables, copper wire, and fiber optics, including the wires that comprise bus 920. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium may be a machine-readable storage device, a machine-readable storage substrate, a memory device, a composition of matter effecting a machine-readable propagated signal, or a combination of one or more of them.

As the user computing system 900 reads data, information may be read from the data and stored in a memory device, such as the memory 910. Additionally, data from the memory 910 servers accessed via a network the bus 920, or the data storage 915 may be read and loaded into the memory 910. Although data is described as being found in the memory 910, it will be understood that data does not have to be stored in the memory 910 and may be stored in other memory accessible to the processor 905 or distributed among several media, such as the data storage 915.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the clauses that follow, are approximate, not exact. In one aspect, they are intended to have a reasonable range that is consistent with the functions to which they relate and with what is customary in the art to which they pertain. It is understood that some or all steps, operations, or processes may be performed automatically, without the intervention of a user. Method clauses may be provided to present elements of the various steps, operations, or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the included clauses. Moreover, nothing disclosed herein is intended to be dedicated to the public regardless of whether such disclosure is explicitly recited in the clauses. No clause element is to be construed under the provisions of 35 U.S.C. § 112 (f) unless the element is expressly recited using the phrase "means for" or, in the case of a method, the element is recited using the phrase "step for." Furthermore, to the extent that the term "include," "have," or the like is used, such term is intended to be inclusive in a manner similar to the term "comprise" as "comprise" is interpreted when employed as a transitional word in a clause.

The Title, Background, and Brief Description of the Drawings of the disclosure are hereby incorporated into the disclosure and are provided as illustrative examples of the disclosure, not as restrictive descriptions. It is submitted with the understanding that they will not be used to limit the scope or meaning of the clauses. In addition, in the Detailed Description, it can be seen that the description provides illustrative examples, and the various features are grouped together in various embodiments for the purpose of streamlining the disclosure. This method of disclosure is not to be interpreted as reflecting an intention that the included subject matter requires more features than are expressly recited in any clause. Rather, as the clauses reflect, inventive subject matter lies in less than all features of a single disclosed configuration or operation. The clauses are hereby incorporated into the Detailed Description, with each clause standing on its own to represent separately patentable subject matter.

The clauses are not intended to be limited to the aspects described herein but are to be accorded the full scope consistent with the language of the clauses and to encompass all legal equivalents. Notwithstanding, none of the clauses are intended to embrace subject matter that fails to satisfy the requirement of 35 U.S.C. § 101, 102, or 103, nor should they be interpreted in such a way.

What is claimed:

1. A system, comprising:
    a controller;
    a handheld device in electronic communication with the controller, wherein the handheld device comprises a housing, wherein the housing defines an internal cavity, and wherein the housing defines an orifice providing access to the internal cavity;
    a trigger comprising an external surface and an internal surface, wherein the trigger is oriented to cover the orifice providing access to the internal cavity;
    a transfer member oriented in the internal cavity and coupled to the internal surface of the trigger;
    a force sensor oriented in the internal cavity and engaged to a distal end of the transfer member and the internal surface of the trigger;
    a transfer roller oriented in the internal cavity and coupled to the distal end of the transfer member;
    a cam oriented in the internal cavity and configured to indirectly engage the transfer member; and
    a motor oriented in the internal cavity and coupled to the cam.

2. The system of claim 1, wherein the motor comprises a rotational motor configured to cause the cam to rotate about an axis.

3. The system of claim 1, wherein the transfer member comprises a proximal end, wherein the proximal end is coupled to the internal surface of the trigger, and wherein a coupling interface between the transfer member and the trigger is configured to permit a rotation at the coupling interface.

4. The transfer member of claim 3, wherein a first section of the distal end of the transfer member engages the force sensor and a second section of the distal end of the transfer member is coupled to the transfer roller.

5. The system of claim 1, further comprising an encoder, wherein the encoder is configured to convert at least rotary position to electronic signals.

6. The system of claim 1, further comprising a gear train coupled to the motor and the cam, wherein the gear train is configured to adjust a rotational speed or a torque applied to the cam by the motor.

7. The system of claim 1, wherein the trigger comprises a Hall effect sensor, wherein the Hall effect sensor provides data regarding a simulated action in an augmented reality/virtual reality environment.

8. A system, comprising:
    a handheld device, wherein the handheld device comprises a housing, wherein the housing defines an internal cavity, and wherein the housing defines an orifice providing access to the internal cavity;
    a trigger comprising an external surface and an internal surface, wherein the trigger is oriented to cover the orifice providing access to the internal cavity;
    a transfer member oriented in the internal cavity and coupled to the internal surface of the trigger;
    a force sensor oriented in the internal cavity and engaged to a distal end of the transfer member and the internal surface of the trigger;
    a transfer roller oriented in the internal cavity and coupled to the distal end of the transfer member;
    a cam oriented in the internal cavity and configured to indirectly engage the transfer member;
    a motor oriented in the internal cavity and coupled to the cam; and
    a controller in electronic communication with the handheld device, wherein the controller is configured to:
        receive, via the force sensor, a force input from the trigger;
        determine, based on the force input, a response force to be applied to the transfer member; and
        cause the motor to initiate a first rotation, transferring a rotational force through the cam and applying the response force to the transfer member.

9. The system of claim 8, wherein the motor comprises a rotational motor configured to cause the cam to rotate about an axis.

10. The system of claim 8, wherein the transfer member comprises a proximal end, wherein the proximal end is coupled to the internal surface of the trigger, and wherein a coupling interface between the transfer member and the trigger is configured to permit a second rotation at the coupling interface.

11. The transfer member of claim 10, wherein a first section of the distal end of the transfer member engages the force sensor and a second section of the distal end of the transfer member is coupled to the transfer roller.

12. The system of claim 8, further comprising an encoder, wherein the encoder is configured to convert at least rotary position to electronic signals.

13. The system of claim 8, further comprising a gear train coupled to the motor and the cam, wherein the gear train is configured to adjust a rotational speed or a torque applied to the cam by the motor.

14. The system of claim 8, wherein the trigger comprises a Hall effect sensor, wherein the Hall effect sensor provides data regarding a simulated action in an augmented reality/virtual reality environment.

15. A system, comprising:
a handheld device, wherein the handheld device comprises a housing, wherein the housing defines an internal cavity, and wherein the housing defines an orifice providing access to the internal cavity;
a trigger comprising an external surface and an internal surface, wherein the trigger is oriented to cover the orifice providing access to the internal cavity;
a transfer member oriented in the internal cavity and coupled to the internal surface of the trigger;
a force sensor oriented in the internal cavity and engaged to a distal end of the transfer member and the internal surface of the trigger;
a transfer roller oriented in the internal cavity and coupled to the distal end of the transfer member;
a cam oriented in the internal cavity and configured to indirectly engage the transfer member;
a motor oriented in the internal cavity and coupled to the cam;
a gear train coupled to the motor and the cam, wherein the gear train is configured to adjust a rotational speed or a torque applied to the cam by the motor; and
a controller in electronic communication with the handheld device, wherein the controller is configured to:
receive, via the force sensor, a force input from the trigger;
determine, based on the force input, a response force to be applied to the transfer member; and
cause the motor to initiate a first rotation, transferring a rotational force through the cam and applying the response force to the transfer member.

16. The system of claim 15, wherein the motor comprises a rotational motor configured to cause the cam to rotate about an axis.

17. The system of claim 15, wherein the transfer member comprises a proximal end, wherein the proximal end is coupled to the internal surface of the trigger, and wherein a coupling interface between the transfer member and the trigger is configured to permit a second rotation at the coupling interface.

18. The transfer member of claim 17, wherein a first section of the distal end of the transfer member engages the force sensor and a second section of the distal end of the transfer member is coupled to the transfer roller.

19. The system of claim 15, further comprising an encoder, wherein the encoder is configured to convert at least rotary position to electronic signals.

20. The system of claim 15, wherein the trigger comprises a Hall effect sensor, wherein the Hall effect sensor provides data regarding a simulated action in an augmented reality/virtual reality environment.

* * * * *